Jan. 19, 1960 R. N. WORTH 2,921,492
PORTABLE METAL SLOTTING SAW
Filed March 26, 1956 4 Sheets-Sheet 1
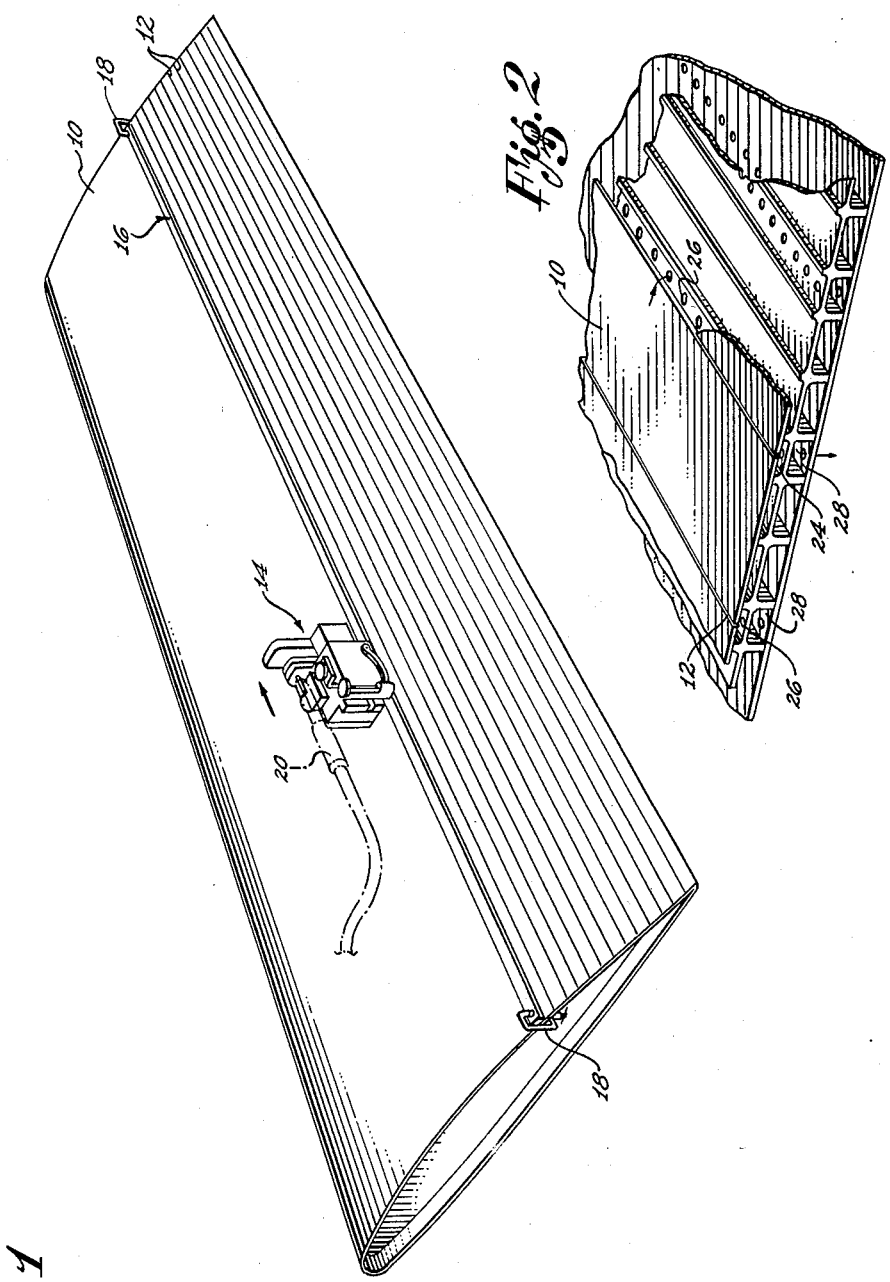
INVENTOR:
Robert N. Worth
By Hubert E. Metcalf
His Patent Attorney Jan. 19, 1960     R. N. WORTH     2,921,492
PORTABLE METAL SLOTTING SAW
Filed March 26, 1956     4 Sheets-Sheet 2
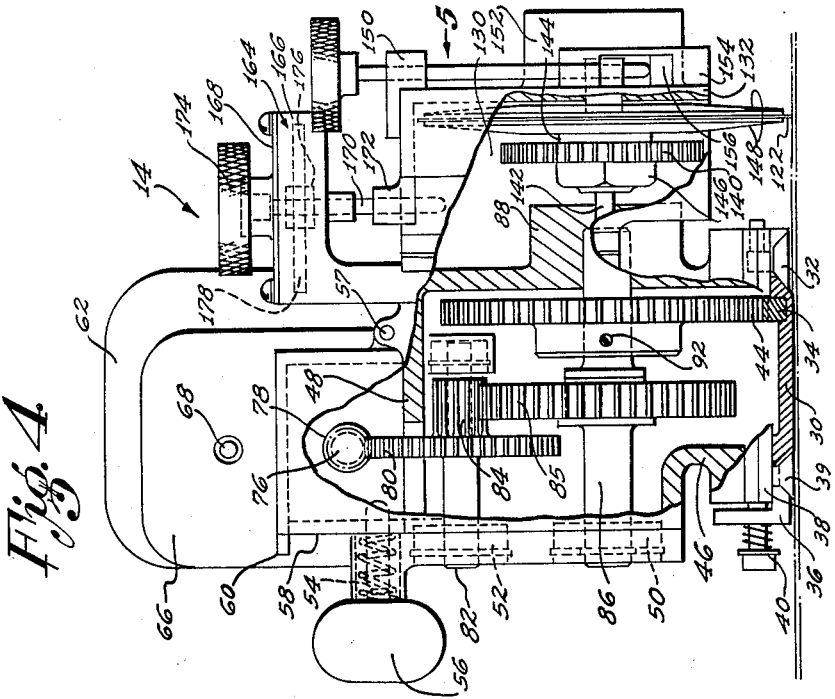
INVENTOR:
Robert N. Worth
His Patent Attorney Jan. 19, 1960  R. N. WORTH  2,921,492
PORTABLE METAL SLOTTING SAW
Filed March 26, 1956  4 Sheets-Sheet 3
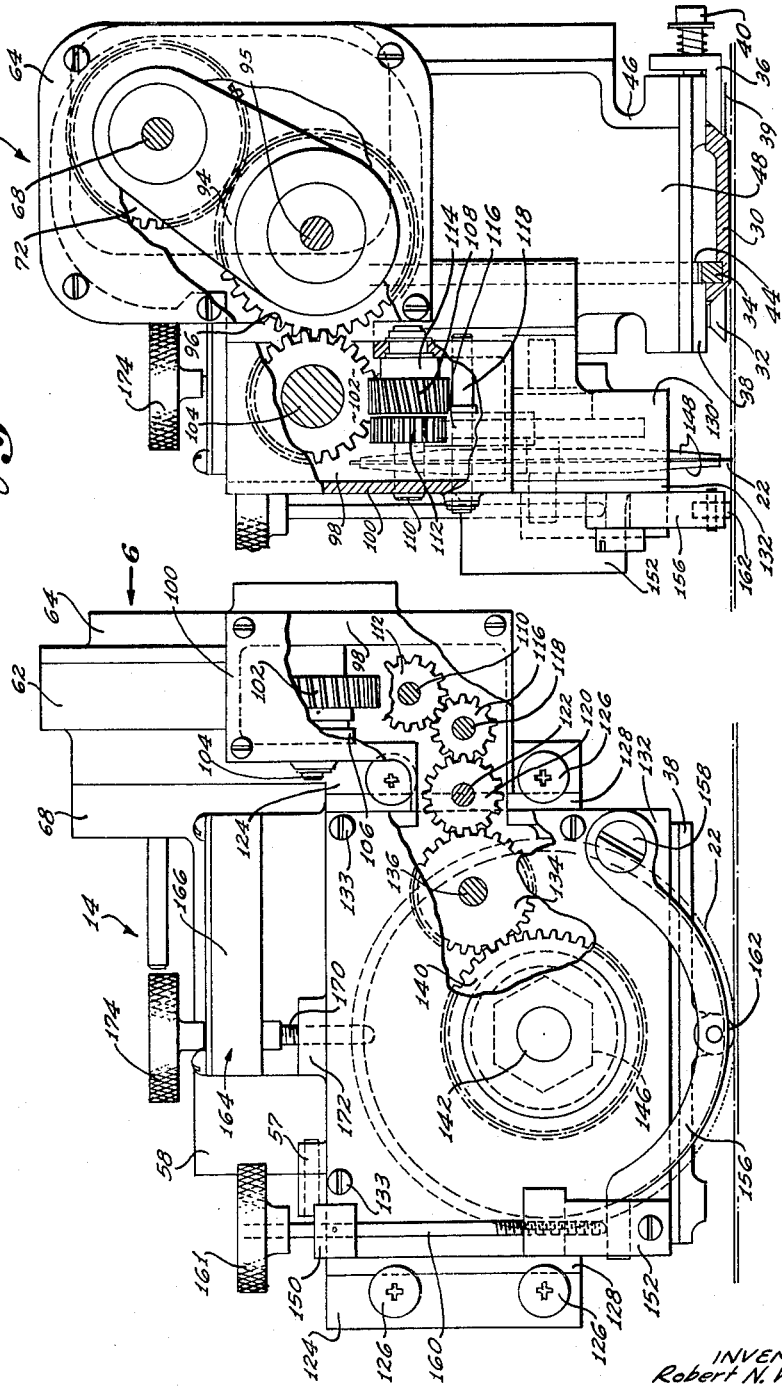
INVENTOR:
Robert N. Worth
By Robert E. Metcalf
His Patent Attorney Jan. 19, 1960 R. N. WORTH 2,921,492
PORTABLE METAL SLOTTING SAW
Filed March 26, 1956 4 Sheets-Sheet 4
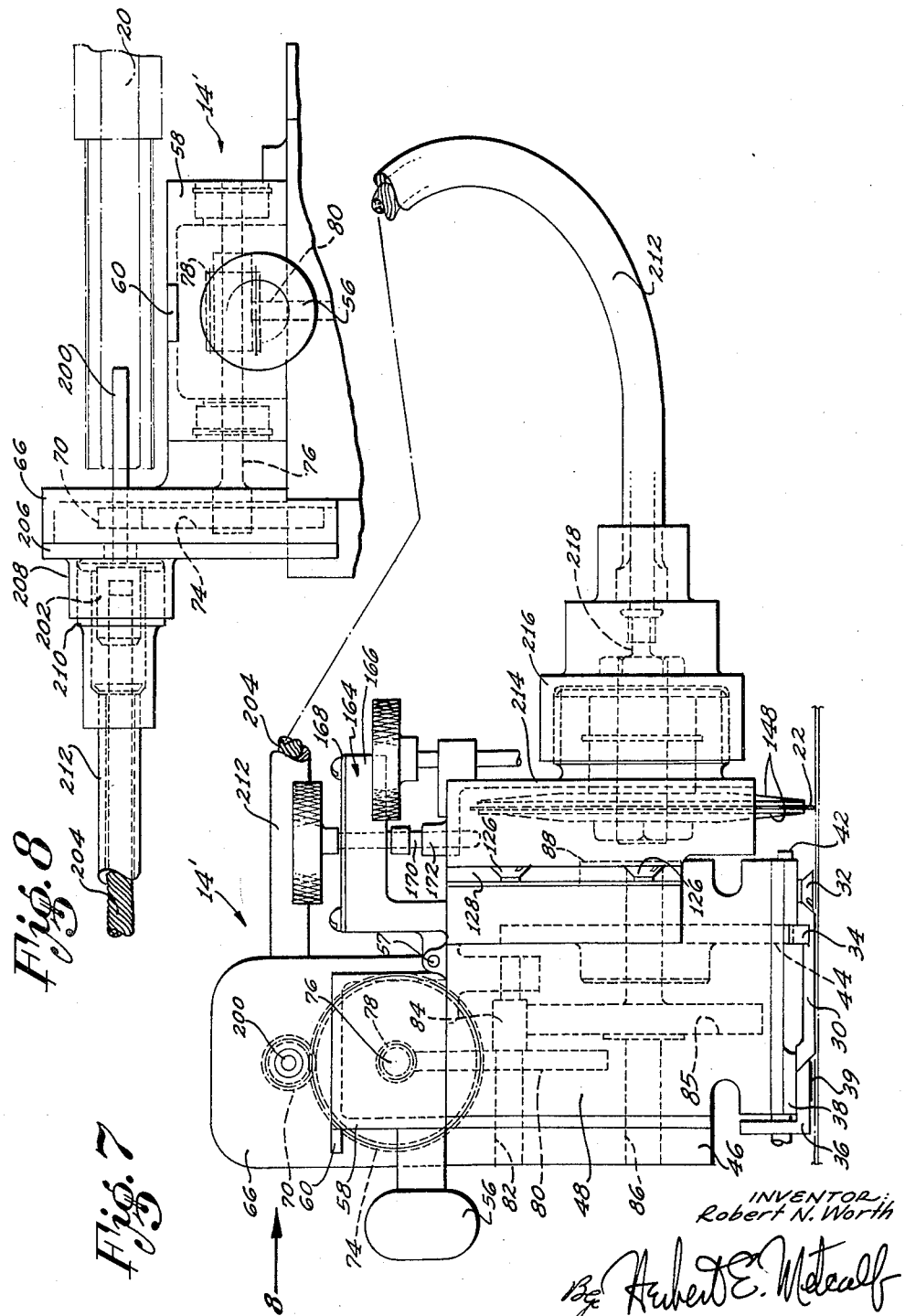
INVENTOR:
Robert N. Worth
By Hubert E. Metcalf
His Patent Attorney

2,921,492
PORTABLE METAL SLOTTING SAW

Robert N. Worth, Playa Del Rey, Calif., assignor to Northrop Corporation, a corporation of California Application March 26, 1956, Serial No. 573,754

6 Claims. (Cl. 83—471)

This invention has to do with hydraulic or pneumatically operated tools and more particularly with a hydraulic or pneumatically operated circular saw.

Portable saws capable of performing work where large and inexact tolerances are permitted are well known in the art. On the other hand, portable saws, hydraulic or pneumatic, that are capable of performing work to close and exact tolerances are little known.

Therefore, an object of this invention is to provide a power operated circular saw that is portable, is capable of operating and traveling over a guided course at a desired speed, is compact in construction, simple of operation, readily fabricated, and performs a cutting operation within close and exact limits.

Briefly, the invention is directed to a rotatable and reciprocable circular saw that is to be mounted on a track and rack. A gear train, operating through the medium of a pneumatic or hydraulic motor, causes the saw to travel along the track at a desired speed. A second gear train or flexible cable connected to the first gear train transmits the action of the motor to the circular saw disc.

Figure 1 is a generally schematic view of the present invention as applied to one form of operation.

Figure 2 is an enlarged view of the material cut by the saw in Figure 1.

Figure 3 is a fragmentary plan view of the invention, parts being broken away for purposes of illustrating certain gears of a gear train.

Figure 4 is a fragmentary side elevation view of the invention looking in the direction indicated by the arrow in Figure 3 and identified by the numeral 4.

Figure 5 is a fragmentary view having embodied therein the present invention and looking in the direction indicated by the arrow (in Fig. 4) and identified by the numeral 5.

Figure 6 is a fragmentary side view having embodied therein the present invention and looking in the direction indicated by the arrow in Figure 5 and identified by the numeral 6.

Figure 7 is a fragmentary view of a modified form of the invention, certain structure being shown in phantom line.

Figure 8 is a fragmentary side elevation view of the modified form of the invention looking in the direction indicated by the arrow found in Figure 7 and identified by the numeral 8.

Referring to the drawings for a more detailed description of the present invention 10 designates a work piece into which has been sawed a plurality of slots 12. The work piece as illustrated in Figure 1 is a section of wing. However, this is not to be considered a limitation for the reason that the saw unit broadly designated 14 may be applied to a large number of uses.

Figure 1 illustrates a track and rack 16 retained on the wing by a pair of C-clamps 18. Any clamping or attaching means may be used to retain the track and rack 16 in the desired position. A hydraulic or pneumatic motor 20 powers the saw to cause the rotation of the circular saw disc 22 and travel of the entire saw unit 14 along the track and rack 16.

The slots 12 are cut through the outer skin or material of the work piece 10 and as a result are in communication with a plenum chamber 24, Figure 2. Openings 26 are provided in the chamber 24 and adjacent chamber 28 for the purpose of "sucking off" boundary layer air as it forms on the wing.

Attention is directed to Figures 3 to 6 inclusive and the form of invention illustrated therein.

The track 30 of the track and rack, Figures 4, 6 and 7, is as illustrated. It is elongated, and generally flat. However, the outer sides are inclined from the vertical toward the center of the rack and as such are adapted to receive a plurality of bevel headed screws 32 that function to assist in retaining the saw 14 on the track 30.

Secured to the track 30 is a rack 34 that is coextensive with the former.

In opposed relationship to the screws 32 are L-shaped members 36 having the end of one leg beveled to conform to the configuration of the track 30.

The screws 32 and members 36 are attached to a plate 38 that is provided with bosses into which the screws 32 are threaded. Fasteners 39 also secure the members 36 to the provided bosses. Further, spring loaded screws 40 extend through a leg of the members 36 and are attached to the bosses. The purpose of the screws 40 is to maintain a positive tension on the members 36 at all times. Fasteners 42 are threaded into the plate 38 and seat against screws 32 to lock the latter in place and prevent backing off or loosening at a critical moment.

The plate 38 has an elongated slot therein through which a spur gear 44 projects. This gear 44 meshes with the rack 34 and through this intermeshing is determined, in part, the speed at which the saw 14 will travel.

Plate 38 is secured to an irregular shaped cover 46 and a substantially hollow case 48. The cover 46 is also secured to the case 48.

Provided in the cover 46 are a pair of spaced apart bearing wells into each of which is inserted ball bearings 50 and 52.

Also provided on the cover is a hollow boss through which projects a spring loaded detent lock 54 having a handle 56.

Hingedly mounted on the case at 57 is drive gear housing 58 having an opening therein into which the detent lock 54 projects to retain housing 58 in the position illustrated in the various figures. The housing 58 has a projection 60 thereon which enables the same to be raised when the detent is disengaged.

Secured to drive gear housing 58 is a gear train housing 62 and cover 64. The drive gear housing 58 has another projection 66 thereon to which gear train housing 62 is attached. Additionally the projection 66 has an opening therein into which an elongated drive shaft 68 projects.

The free end of the shaft 68 that is exterior of the drive gear housing is engaged by the motor 20 in the manner illustrated in Figure 1 of the drawings.

That portion of shaft 68 within drive gear housing 58 is bearing supported and has thereon a spur gear 70. On the end of shaft 68 in opposed relation to the free end thereof and spaced from gear 70 is a helical gear 72. The latter is located in gear train housing 62.

Spur gear 70 meshes with a larger spur gear 74 also in the drive gear housing. The last mentioned spur gear is secured to a bearing supported shaft 76, Figures 7 and 8. Spaced from spur 74, on and intermediate the ends of the shaft 76, is a worm 78.

The worm 78 in turn meshes with a worm gear 80 mounted on a bearing supported shaft 82. The latter gear and shaft being located in case 48. Adjacent worm gear 80 and also on shaft 82 is a helical gear 84 that meshes with another helical gear 85 on a bearing supported shaft 86. One end of shaft 86 is supported in a cup 88 integral with the case 48. Mounted on the shaft 86 between gear 85 and the cup 88 is the spur gear 44, the latter having a hub through which extends a set screw 92. The spur gear 44 as stated meshes with the rack 34.

It may now be seen that when the motor 20 rotates drive shaft 68 the saw unit 14 is caused to travel along the rack and track 16. The speed of the motor plus the gear ratio between gear 44 and the rack 34 determines the speed at which the saw unit 14 travels along the rack and track 16.

Further, it may be determined that when the detent lock 54 is disengaged from the opening in the drive gear housing 58, the latter may be raised. Raising the drive gear housing 58 results in disengaging the worm 78 from the worm gear 80. As a result travel of the saw unit 14 ceases even though the motor may still be operating to rotate drive shaft 68.

Returning to shaft 68 and the helical gear 72 located on the end thereof. This last mentioned gear meshes with a helical gear 94 mounted on a bearing supported shaft 95 in the gear train housing 62.

One side of the gear train housing 62 has a slot or opening therein through which a portion of the helical gear extends as at 96.

Secured to gear train housing 62 is a second gear train housing 98 having a cover 100 secured thereon.

Helical gear 94 meshes with another helical gear 102 secured to a bearing supported shaft 104 located in the gear train housing 98. Adjacent helical gear 102 and a shaft 104 is a thrust ball bearing 106.

Helical gear 102 meshes with another helical gear 108 on a bearing supported shaft 110, Figures 5 and 6. Adjacent the helical gear 108 and on the shaft 110 is a spur gear 112. Also on shaft 110 and in opposed relation to spur gear 112 and adjacent helical gear 108 is a thrust ball bearing 114.

The spur gear 112 meshes with a smaller spur gear 116 mounted on a bearing supported shaft 118, and spur gear 116 in turn meshes with a spur gear 120 secured on a bearing supported shaft 122.

The case 48 has a pair of spaced apart wings 124 into which bevel headed fasteners 126 are threaded, Figure 5. These fasteners 126 embrace inclined tracks 128 of the saw housing 130, that is positioned therebetween. Protecting the circular saw disc 22 of the saw unit 14 is a cover 132 that is fastened to the saw housing 130 by screws 133 or the like.

Spur gear 120 meshes with a spur gear 134 mounted on a shaft 136 that is bearing supported in saw housing 130.

Spur gear 134 meshes with another spur gear 140 on shaft 142. One end of shaft 142 is supported in a bearing that is located in the cover 132 and the opposed end of the shaft is supported in an opening in the bottom of cup 88 in the manner illustrated in Figure 4.

Circular saw disc 22 is also on shaft 142 and maintained spaced from spur gear 140 by a washer or spacer 144. Both the saw disc 22 and spur gear 140 are retained properly positioned on the shaft by a nut 146.

Positioned on each side of the saw disc 22 is a saw guard 148.

The saw housing has an L-shaped member 150 fastened thereto that extends over the cover 132 in the manner illustrated in Figures 4 and 5. An L-shaped member 152 is made integral with the cover 132 and is secured to a block 154 that is in turn fastened to the cover. As a result a space is provided between a leg member 152 and block 154 that accommodates the free end of an arcuate leg 156 pivotally secured on the cover 132 by a screw 158 in the manner illustrated in Figures 4, 5, and 6.

Extending through the member 150 and threadably extending through a leg of member 152 is a rod 160 that engages the free end of the arcuate leg 156. The rod 160 has a knurled knob or handle 161 thereon for rotating the same. As a result the leg 156 can be adjusted to properly support the saw unit 14 in a level or other desired position.

Intermediate the ends of the leg 156 is a roller 162 that facilitates movement of the saw unit as it is caused to travel.

The saw housing 130 may be slidably adjusted up and down between the beveled fasteners 126. This slidable adjustment is accomplished in the following manner and obviously such adjustment is for the purpose of regulating the depth of cut to be made by the saw disc 22.

The case 48 adjacent drive gear housing 58 has an L-shaped projection 164 thereon, one leg 166 of which is hollow and has a cover 168 thereon. The cover 168 has an opening 169 therein. Extending through leg 166 is a threaded rod or shaft 170 that is received and extends through a threaded boss 172 on saw housing 130 in the manner illustrated in Figure 4. Secured to the free end of the rod 170 is a knurled handle 174.

Secured to the rod 170 and positioned in the hollow leg 166 is a gear 176 that meshes with another spur gear 178 also in leg 166. Around the circumference of the spur gear 178 is indicia that may be read through the opening 169 in cover 168. As the knurled handle 174 is turned the saw housing 130 slides up and down between bevel headed fasteners 126.

However, in order to insure that there is always a sufficient meshing between spur gear 120 and 134 the sliding of the saw housing is restricted to a finite amount. The amount of sliding depends of course to a certain degree on the size of gears 120 and 134.

The plate 38, cover 46, case 48, drive gear housing 58, gear train housing 62, cover 64, second gear train housing 98, cover 100, saw housing 130 and cover 132 may be considered the body for the saw unit 14.

The operation of that form of the invention illustrated in Figures 3 to 6 inclusive is as follows: the rack and track 16 is laid on the work to be cut and clamped into place. The hydraulic or pneumatic motor 20 is attached to the free end of shaft 68. The depth of cut the circular saw disc 22 is to make is determined by rotating the knurled handle 174 to rotate the rod 170. This movement is transmitted to the saw housing 130 which is caused to slide either up or down. The amount of adjustment of the housing 130 may be determined by referring to the indicia on the micrometer or gear 178. Again, reference is made to the fact that the adjustment is not to be so great as to break the meshing relationship between gears 120 and 134.

Following the determining of the depth of the cut to be made the motor 20 is turned on. The motion of the motor is transmitted from gear 70 to gear 44 to cause the saw unit to travel along the rack and track 16. Also the motion of the motor 20 is transmitted from gear 70 through the gear train to gear 140 to cause rotation of the circular saw disc 22.

Once the initial cut in the work is made the leg 156 may be lowered into contact with the work through the rod 160 and handle 161. As may be readily determined leg 156 supports the saw unit 14 on one side.

If it is desired to stop the travel and cut of the saw unit 14, the detent lock 54 may be disengaged from the opening in the drive gear housing 58 and the housing lifted. This, as stated previously, disengages the worm 78 from the worm gear 80.

Further, the depth of cut the circular saw disc 22 is to make can be determined after the motor 20 is energized. In other words a cut may be started intermediate the ends of the work piece.

Attention is directed to that form of the invention illustrated in Figures 7 and 8.

The structure from the spur gear 70 through the gear train to gear 44, including the rack and track is identical to that illustrated in the form of the invention shown in Figures 3 to 6 inclusive.

Spur gear 70 is secured to a shaft 200 the free end of which is adapted to receive a motor 20. That end of shaft 200 in opposed relation to the free end has an adaptor 202 thereon that receives the end of a flexible cable 204.

Projection 66 has a cover 206 thereon through which the shaft extends and on the cover is an internally threaded hollow boss 208. The boss receives a threaded fitting 210 and the latter has attached thereto an arcuate section of tubing 212. The flexible cable 204 is enclosed within the tubing 212 and extends into the fitting 210 and as stated is received by the shaft 200.

The cover 214 enclosing the saw housing 130 has a hollow externally threaded boss thereon that is adapted to receive a bell fitting 216.

The bearing supported shaft 218 upon which is mounted the saw disc 22 extends through the cover 214 and into the bell fitting 216 in the manner illustrated in Figure 7 of the drawings.

That end of the tubing 212 in opposed relation to fitting 210 is affixed to the bell fitting 216 and the flexible cable 204 is adapted to slide over the shaft 218.

Except for the gear train housings and related structure illustrated in Figures 3 to 6 inclusive the balance of the structure illustrated in Figures 7 and 8 inclusive is identical.

The operation of the device in Figures 7 and 8 is very similar to that illustrated in Figures 3 to 6 inclusive and is as follows:

The track and rack 16 is clamped to the work to be cut. The depth of the cut of the saw disc 22 is determined and the motor 20 is applied to the free end of shaft 200. The motion of the motor 20 is again transmitted from gear 70 to gear 44 and the rack and track 16.

Further the motion of the motor is transmitted through the shaft 200, flexible cable 204, shaft 218 to the saw disc 22.

The leg 156 is lowered onto the work in the same manner as previously stated.

It may be noted that the saw housing 130 may be raised and lowered a greater amount than that form of the invention illustrated in Figures 3 to 6 inclusive.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An instrument for sawing comprising a hollow body within which a circular saw blade is rotatably mounted; a first gear train within said body; a track and rack, to be placed on the material to be cut, upon which the body rests and one of the gears of the gear train engages to control the direction of travel and speed of cut of said saw; a second gear train connected to the first gear train and saw; a motor that engages the first gear train to rotate the latter, the second gear train and saw.

2. An instrument for sawing comprising a hollow body within which a circular saw blade is rotatably mounted; a first gear train within said body; a track and rack, to be placed on the material to be cut, upon which the body rests and one of the gears of the gear train engages to control the direction of travel and speed of cut of said saw; a second gear train connected to the first gear train and saw; a motor that engages the first gear train to rotate the latter, the second gear train and saw; and a clutch mechanism on said body for disengaging the first gear train to stop the travel of said saw.

3. An instrument for sawing comprising a hollow body within which a circular saw blade is rotatably mounted; a first gear train within said body; a track and rack, to be placed on the material to be cut, upon which the body rests and one of the gears of the gear train engages to control the direction of travel and speed of cut of said saw; a second gear train connected to the first gear train and saw; a motor that engages the first gear train to rotate the latter, the second gear train and saw; and micrometer structure mounted in said body for raising and lowering the saw blade.

4. An instrument for sawing comprising a hollow body within which a circular saw blade is rotatably mounted; a first gear train within said body; a track and rack, to be placed on the material to be cut, upon which the body rests and one of the gears of the gear train engages to control the direction of travel and speed of cut of said saw; a second gear train connected to the first gear train and saw; a motor that engages the first gear train to rotate the latter, the second gear train and saw; and a leg spaced from said rack and track and on said body that partially supports said body on the material to be cut.

5. An instrument for sawing comprising a hollow body within which a circular saw blade is rotatably mounted; a first gear train within said body; a track and rack, to be placed on the material to be cut, upon which the body rests and one of the gears of the gear train engages to control the direction of travel and speed of cut of said saw; a second gear train connected to the first gear train and saw; a motor that engages the first gear train to rotate the latter, the second gear train and saw; a clutch on said body for disengaging the first gear train from said instrument to stop the travel of said saw; and micrometer structure mounted in said body for raising and lowering the saw blade.

6. An instrument for sawing comprising a hollow body within which a circular saw blade is rotatably mounted; a first gear train within said body; a track and rack, to be placed on the material to be cut, upon which the body rests and one of the gears of the gear train engages to control the direction of travel and speed of cut of said saw; a second gear train connected to the first gear train and saw; a motor that engages the first gear train to rotate the latter, the second gear train and saw; a clutch on said body for disengaging the first gear train from said instrument to stop the travel of said saw; and a leg spaced from said rack and track and on said body that supports said body on the material to be cut.

References Cited in the file of this patent
UNITED STATES PATENTS

| Number | Name | Date |
|---|---|---|
| 637,490 | Tower et al. | Nov. 21, 1899 |
| 662,720 | Hansmann | Nov. 27, 1900 |
| 1,339,490 | Williams | May 11, 1920 |
| 1,454,901 | McArthur | May 15, 1923 |
| 1,803,068 | McKeage | Apr. 28, 1931 |
| 1,823,774 | Williams | Sept. 15, 1931 |
| 1,930,073 | Bentley et al. | Oct. 10, 1933 |
| 2,014,229 | Emmons | Sept. 10, 1935 |
| 2,017,535 | Hammer | Oct. 15, 1935 |
| 2,069,700 | Emmons | Feb. 2, 1937 |
| 2,075,369 | Stetler | Mar. 30, 1937 |
| 2,161,040 | Harmon | June 6, 1939 |
| 2,246,761 | Saliba et al. | June 24, 1941 |
| 2,382,898 | Nagin | Aug. 14, 1945 |
| 2,630,147 | Garberg | Mar. 3, 1953 |
| 2,766,511 | Lamoureaux | Oct. 16, 1956 |